United States Patent [19]
Francois

[11] Patent Number: 6,134,862
[45] Date of Patent: Oct. 24, 2000

[54] DEVICE FOR PRESENTING AND ADJUSTING A STOCK BOX FOR REMOVING OR STORING ARTICLES

[75] Inventor: Luc Francois, Bains-sur-Oust, France

[73] Assignee: Atlas S.A., France

[21] Appl. No.: 09/355,286

[22] PCT Filed: Jan. 26, 1998

[86] PCT No.: PCT/FR98/00127

§ 371 Date: Jul. 27, 1999

§ 102(e) Date: Jul. 27, 1999

[87] PCT Pub. No.: WO98/32681

PCT Pub. Date: Jul. 30, 1998

[30] Foreign Application Priority Data

Jan. 28, 1997 [FR] France ................................ 97 01127

[51] Int. Cl.[7] .................................................. B65B 67/00
[52] U.S. Cl. ............................. 53/390; 53/391; 414/743; 254/8 R
[58] Field of Search ..................... 53/390, 391; 269/310, 269/59; 414/793.8, 422, 418, 639, 743; 254/124, 8 R

[56] References Cited

U.S. PATENT DOCUMENTS

| | | | |
|---|---|---|---|
| 1,641,881 | 4/1927 | DeLain ................................. | 193/18 |
| 3,176,828 | 4/1965 | Sullivan ............................... | 193/35 C |
| 3,702,662 | 11/1972 | Davieau ............................... | 414/422 |
| 4,909,697 | 3/1990 | Bernard, II et al. .................. | 53/391 |
| 5,375,963 | 12/1994 | Wohlwend .......................... | 414/685 |
| 6,010,299 | 1/2000 | Jesswein ............................. | 414/743 |

FOREIGN PATENT DOCUMENTS 1334334  7/1963  France.

*Primary Examiner*—Peter Vo
*Assistant Examiner*—Christopher Harmon
*Attorney, Agent, or Firm*—Mason, Kolehmainen, Rathburn & Wyss

[57] ABSTRACT

The invention relates to apparatus for presenting and orienting a box (B) in order to enable articles to be removed or stored. The apparatus is characterized by the fact that it comprises a pair of parallel hinged arms (4) which are extended by a pivoting box support (5), the hinged arms (4) being movable both ways between a low position and a high position, in both of which positions the support (5) is substantially horizontal, thereby enabling the box (B) to be placed on the support (5) or to be removed therefrom, the arms moving via an intermediate position in which the support (5) is inclined relative to the horizontal and facilitates access to the inside of the box (B) to remove said articles or to put them into place.

12 Claims, 3 Drawing Sheets

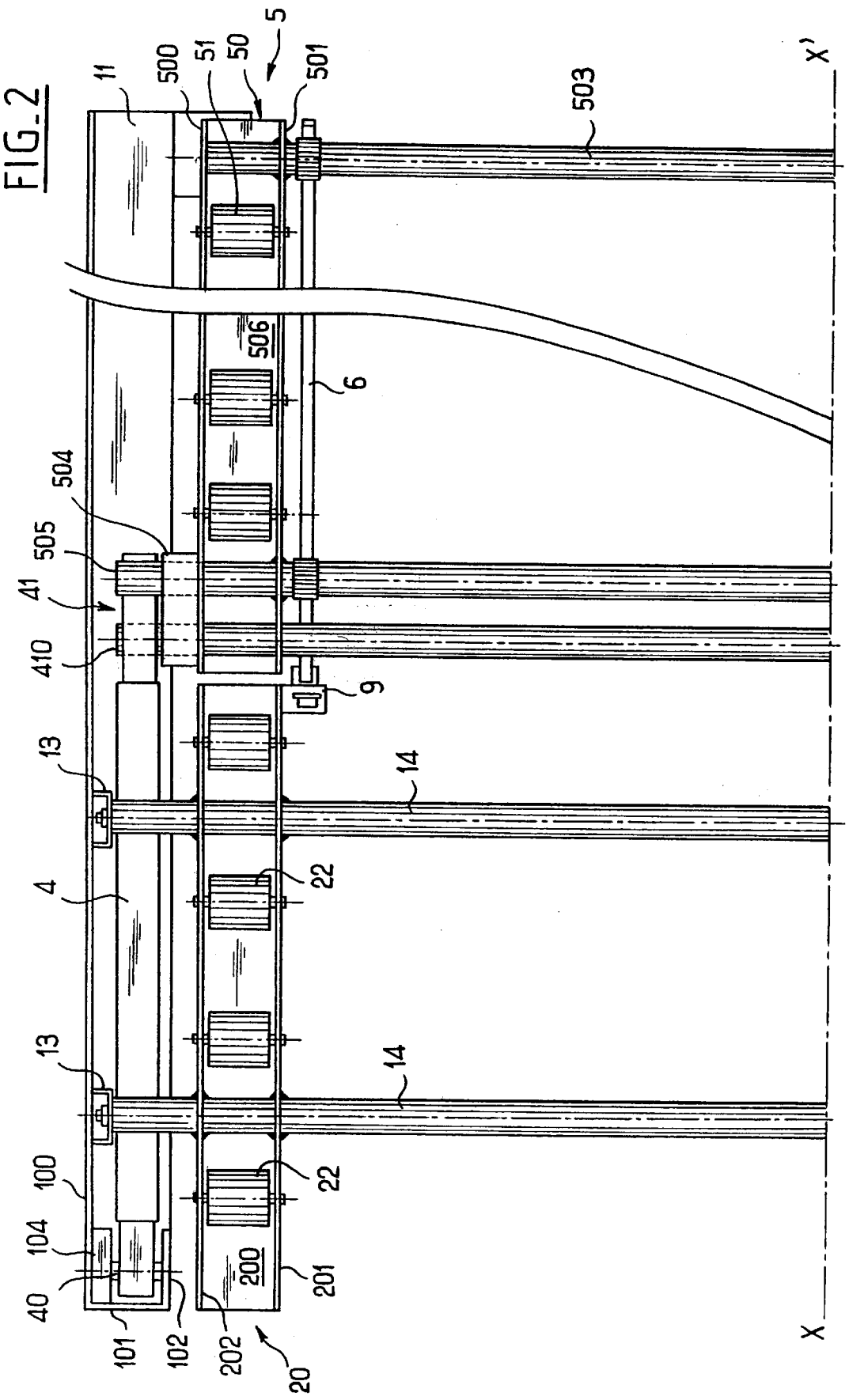

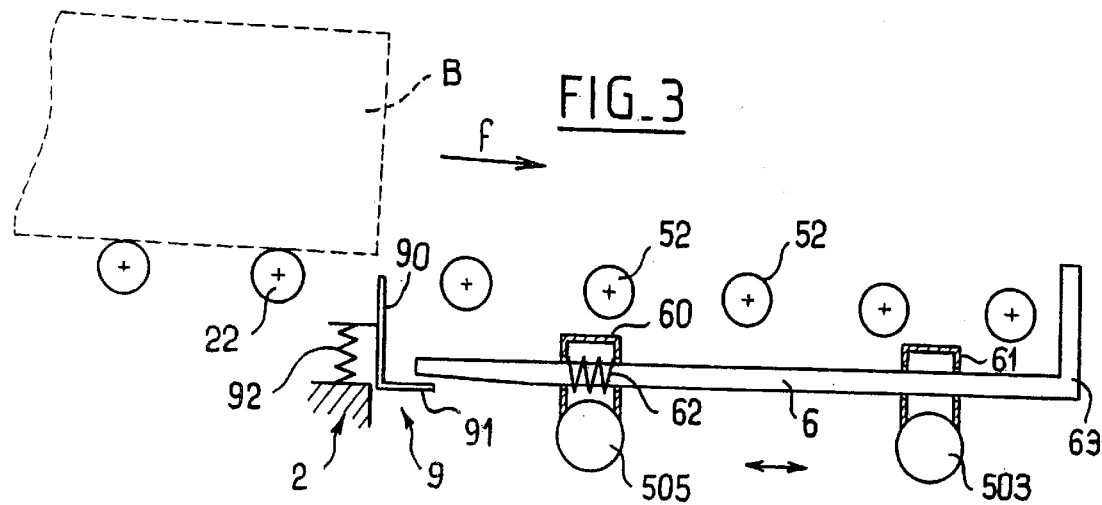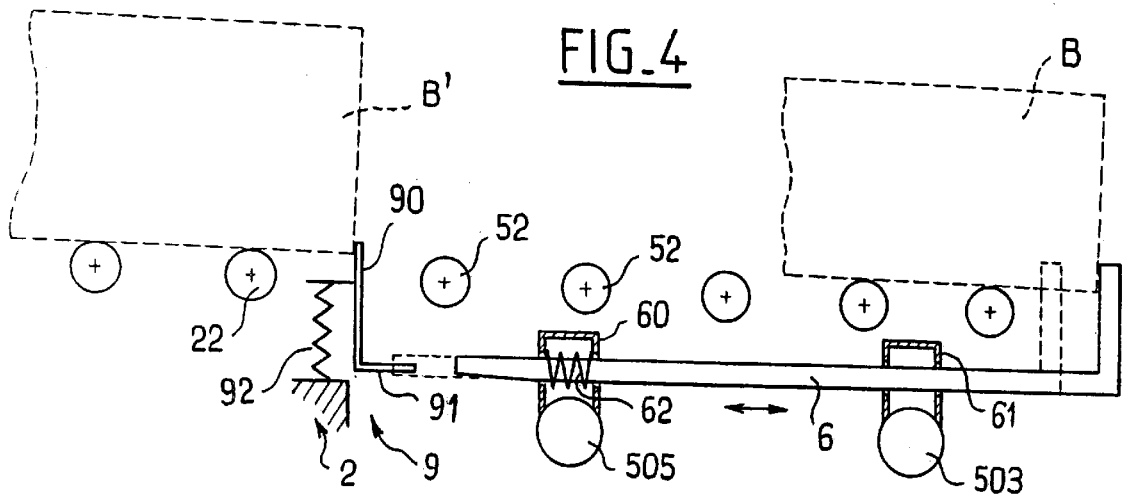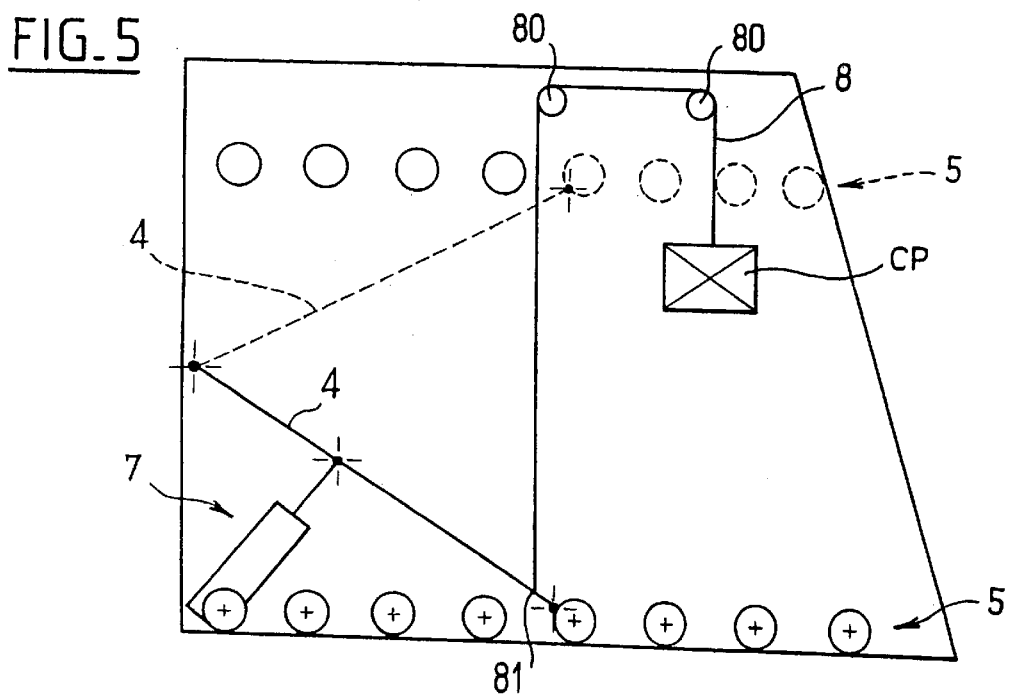

DEVICE FOR PRESENTING AND ADJUSTING A STOCK BOX FOR REMOVING OR STORING ARTICLES

BACKGROUND OF THE INVENTION

1. Field of the Invention

The present invention relates to apparatus for resenting and orienting a stock box for removing or receiving articles.

2. Background of the Invention

A particular but non-exclusive application of the apparatus lies in supplying boxes of parts to work stations beside an assembly line.

Particularly in the automobile industry field, there are to be found numerous assembly stations where operators need to take parts from boxes containing them for the purpose of mounting the parts on the motor vehicle that is being assembled.

The boxes are generally of large size and are fixed to a pallet.

When the boxes are placed on the ground, the operator must, on each occasion, bend down to remove a part. As the box empties, the movement that needs to be performed becomes more and more tiring.

In addition, once the box is empty, it must be replaced with another box, and that takes time. Naturally, another solution consists in providing a second box that is full of parts, placed beside the first. Nevertheless, it will be understood that under such circumstances, a certain amount of working space is wasted pointlessly.

SUMMARY OF THE INVENTION

An object of the present invention is to mitigate those drawbacks.

More precisely, the invention seeks to propose apparatus for presenting and orienting a stock box for removing or receiving articles, and that is advantageous, ergonomically speaking, i.e. the operator no longer needs to bend down to remove the articles or to put them into place.

An appliance of this type is described in document U.S. Pat. No. 2,942,716. It relates to apparatus for presenting and orienting a stock box for removing or receiving articles, which apparatus comprises a pivoting box support which is movable both ways between a low position and a high position, via an intermediate position in which the support is inclined relative to the horizontal. The support is hinged along one of its sides, while being fixed on its opposite side to a set of cables passing over return pulleys.

The cables are displaced over the pulleys by a system of vertical axis actuators having rods that carry respective main pulleys. It is the movement of the rods that causes the cables to move relative to the pulleys.

The invention also seeks to provide apparatus which, for given size, combines both a station for putting full boxes into position and a station for removing empty boxes (or vice versa).

Finally, the invention seeks to provide apparatus of a design that is simple and easy to use.

According to the invention, the apparatus comprises a pair of parallel hinged arms which are extended by a pivoting box support, the hinged arms being movable both ways between a low position and a high position, in both of which positions the support is substantially horizontal, thereby enabling the box to be placed on the support or to be removed therefrom, the arms moving via an intermediate position in which the support is inclined relative to the horizontal and facilitates access to the inside of the box to remove said articles or to put them into place, and by the fact that said arms have respective engagement fingers at their free ends suitable for co-operating with respective studs secured to the support to lock mutual hinging between the arms and the support from a certain angle, thereby enabling the support and the associated box to be brought into the position where they are inclined relative to the horizontal.

Although reference is made above to the automobile industry, the apparatus of the invention can be used in any industry where there is a need to supply a production line with individual articles. For example, that can be the farm-produce industry, electronics, etc. The invention is also applicable in any activity where it is necessary to place articles one by one in a box. This also applies to the food industry.

Furthermore, according to other characteristics that are advantageous but not limiting:

said arms are hinged firstly to a fixed frame and secondly to said support;

the apparatus includes actuator means for actuating said hinged arms;

said actuator means comprise an actuator acting as a conventional actuator when the box is transferred upwards, and acting as means for slowing down and/or locking when transfer of the box takes place downwards;

said angle is about 150°;

in said intermediate position, said support bears against an element of the frame;

the apparatus has a positioning station and a removal station for the box which are placed vertically in register with the space occupied by the parallel arms;

said stations have rails for guiding the box, said rails being inclined at a few degrees relative to the horizontal to facilitate putting the box into position or removing it, said support being in line with the rails when it is in its high position or its low position;

said rails and/or the support are provided with running wheels;

the apparatus includes means suitable for allowing a box to be put into place on the support only when the support is to be found, without a box, in line with the positioning station; and when the box is transferred downwards, the apparatus includes a counterweight suitable for returning the support to the high position to enable a new box to be put into place.

BRIEF DESCRIPTION OF THE DRAWINGS

Other characteristics and advantages of the invention will appear on reading the following detailed description of a preferred embodiment. The description is given with reference to the accompanying drawings, in which:

FIG. 2 is a diagrammatic half-plan view of the FIG. 1 apparatus, the box support being in its high position;

FIGS. 3 and 4 are diagrammatic views for illustrating the structure and the operation of stops for the box while loading the apparatus; and FIG. 5 is a theoretical diagram showing the structure of an apparatus with which boxes are transferred downwards.

DETAILED DESCRIPTION OF THE PREFERRED EMBODIMENT

Figure 1:
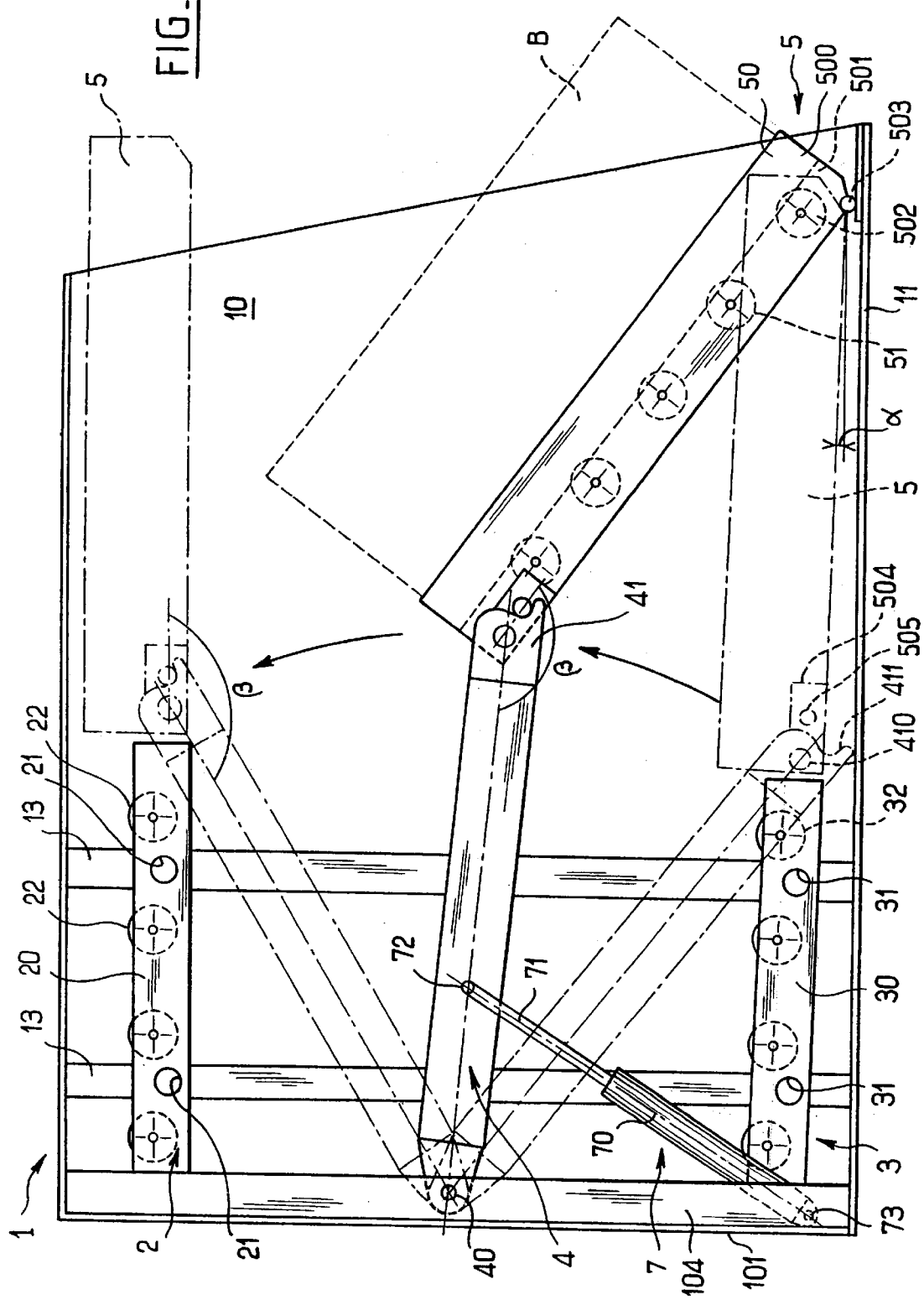
FIG. 1 is a diagrammatic side view of the apparatus, a vertical cover-forming wall having been removed to show the internal elements fitted thereto.

The presenting and orienting apparatus shown in accompanying FIGS. 1 and 2 is symmetrical in structure about a middle vertical plane represented by chain-dotted line XX' in FIG. 2. That is why only half a view appears in the figure, the portion of the apparatus that is not visible being the image of the portion actually shown, as reflected about the plane of symmetry XX'. This plane is longitudinal, with the front of the apparatus appearing to the right of FIGS. 1 and 2.

The apparatus of the invention in this case serves to present a stock box containing articles to be removed, and it is constituted by a metal frame given reference 1. It is defined laterally by two parallel vertical partitions 100, each having a base 11 folded inwards through 90° so as to be capable of resting on a support such as the ground. The vertical rear end of the partition, visible on the left of FIG. 2, is folded firstly inwards through 90° to form a wall 101 and secondly inwards again through 90° to constitute a vertical end flange 102 extending parallel to the partition 100. The wall 101 and the flange 102 co-operate with the partition 100 to form a kind of channel member. A vertical bar 104 is fixed against the inside face of the partition 100, facing the flange 102.

The frame 1 is stiffened by a set of two pairs of vertical channel section bars 13. Each pair of bars is welded via the flanges of its channel to the inside face of the partition 100. They extend spaced apart from each other, occupying substantially the rear half of the partition 100. The two partitions 100 of the apparatus thus have two channel bars 13 each.

The channel bars face each other in pairs and their top and bottom portions are interconnected by cylindrical metal tubes 14. The tubes extend transversely and horizontally relative to the chassis.

Although not really visible in the figures, at the top, the tube 14 closest to the rear of the apparatus extends on a level that is slightly lower than the second tube. In contrast, at the bottom, the tube 14 closer to the rear of the apparatus extends on a level that is slightly higher than the second tube. The reason for this organization is explained in the description below.

The tubes 14 are fastened to the bars 13 by a bolt system. Nevertheless, any other fastening system known to the person skilled in the art could be used.

The apparatus of the invention has a positioning station for receiving a stock box, and a removal station from which the box is removed. In the example shown in FIGS. 1 and 2, the positioning station is at the bottom of the apparatus while the removal station is at the top. Nevertheless, this organization could be inverted if it is desired to cause a box to transit downwards instead of upwards.

The positioning station 3 is constituted by two parallel channel-section rails 30 whose flanges extend vertically upwards. Two pairs of openings 31 are formed in these flanges with the above-mentioned tubes 14 passing therethrough. Weld spots serve, for example, to bond the rails 30 to the tubes 14.

In plan view, the flanges of the rails 30 extend parallel to the vertical wall 100 of the frame, at a short distance from its end flange 102.

Between the flanges of the rails 30, there are mounted a series of running wheels 32 having horizontal axes of rotation. For this purpose, openings are formed therein which receive the axles of the wheels. Naturally, the top generator lines of the wheels occupy a level that is slightly higher than the top edges of the flanges of the rails.

It will readily be understood that this pair of rails together with the associated wheels make it possible to support and to move a box of appropriate dimensions.

Because of the small difference in height between the tubes 14, the rails 30 are likewise slightly inclined relative to the horizontal, with a slope that extends downwards from the rear of the apparatus towards the front at an angle of inclination α of about 2°.

The box removal station which is provided at the top of the apparatus is of a structure that is substantially analogous to that of the positioning station.

Specifically, it comprises a pair of channel section rails 20 each having a web 200 and parallel flanges 201 and 202. The flanges have openings 21 through which the transverse tubes pass. These rails are provided with a series of wheels 22 that are distributed and organized in the same manner as the wheels fitted to the first station 3.

It will be observed that the rails 20 are slightly inclined relative to the horizontal, having a rising slope from the rear towards the front, and having the same angle as that mentioned above. The rails 30 are exactly beneath the rails 20 of the second station, which explains why they are not visible in FIG. 2.

The apparatus of the invention also has a pair of parallel arms 4 each occupying a vertical plane. These arms are located close to the partitions 100 of the frame and they are hinged at their bottom portions about an axis 40 which is mounted between the channel section flanges formed by said partitions 100 and the above-described wall elements 101 and 102. As can be seen more particularly in FIG. 1, the hinge is situated substantially halfway up the apparatus.

Also at the above-mentioned channel section portions, but near the bottom thereof, there are hinged the cylinders 70 of two actuators 7 which extend parallel to each other. The actuator rods 72 are hinged to respective ones of the arms 4, e.g. via notches provided therein.

It will be observed that the disposition of the rails 20 and 30 of positioning and removal stations as described above is such that these stations are stacked vertically; the space between is defined by the movement of the parallel arms 4, in addition to the box B and angled box support 5, so that the receiving and/or removal process of the box is allowable.

The free ends 41 of the arms 4 (remote from their ends hinged to the frame) are rounded in shape with respective engagement fingers 411 whose function is explained below.

The two arms 4 are interconnected transversely at their free ends 41 by a transverse cylindrical tube 410 that is rotatably mounted and that forms a hinge axis for a pivoting box support that is described below.

This box support, given general reference 5, essentially comprises two parallel rails 50 which, as shown in FIG. 2, extend in line with the rails 20 and 30. Each rail 50 is of channel section with an outer flange 500 that is taller than its inner flange 501. The webs of these rails are referenced 506 in the FIG. 2.

Rotary wheels 51 extend between the flanges of the rails and like the wheels of the positioning and removal stations, they have top generator lines at a level slightly higher than the edge of the flanges 501. The taller flanges 500 serve as guide means for a box.

Against the outer face of the flange 500, not far from its rear end, there is provided an outwardly-projecting piece 504 in the form of a rectangular parallelepiped. This piece has the axis-forming tube 410 passing therethrough, which tube also passes through both rails 50.

The two rails 50 are also secured to each other by means of parallel transverse tubes 503 and 505, the tube 503 being close to the front ends of the rails 50 while the tube 505 is adjacent to the tube 410.

The tube 503 passes through the flanges 501 of the rails 50 and comes to an end level with the outer flanges 500. In contrast, the tube 505 passes through the outer flanges 500 and through the pieces 504 to project outwards in the form of an end stud. The tubes 503 and 505 are secured to the rails 50, e.g. by spot welds.

The apparatus is fitted with a system of abutments or stops given references 6 and 9 in the figures. Nevertheless, its structure and function are more convenient to explain when describing how the apparatus of the invention is used.

To proceed with this description, it is assumed that it is desired to put a box filled with parts into position in the apparatus of the invention.

For this purpose, it is also assumed that the actuators 7 of the apparatus have their rods 71 retracted, which means that the arms 4 are occupying a low position as shown in chain-dotted lines in FIG. 1. In this position, it will be understood that the support 5 which is hinged relative to the arms 4 about the axis 410 lies in line with the rails 30 of the positioning station.

A box B is then engaged via the rear of the apparatus, e.g. by means of a pallet truck, so that it runs on the wheels 32 of the positioning station. This operation is made easier by the slight slope of the rails 30 of the support 5.

As shown in FIGS. 2 and 3, a retractable stop 7 is fixed along an inner flange of one of the rails 20. This vertically-slidable stop is generally L-shaped, having a vertical flange 90 and a horizontal flange 91. This stop is coupled to a spring 92 which constantly tends to urge the stop upwards. Above the plane defined by the top tubes 503 and 505 of the support 5, a rod-shaped sliding stop 6 extends longitudinally, having an angled front free end to constitute a vertical tab 63.

The stop 6 passes through two cages 60 and 61 disposed respectively above the tubes 503 and 505. A spring 62 housed in one of the cages 60 tends constantly to urge the stop 6 towards the rear of the apparatus. Nevertheless, in such a position, the stop 6 retracts the stop 9 downwards. The portion 90 thereof then does not interfere with a box B that is in position in the positioning station being transferred towards the box support 5.

Once this transfer has been done (see arrow f, FIG. 3), longitudinal sliding of the box is limited by the vertical tab 63 of the stop 6.

The apparatus is then in the position shown in FIG. 4. While holding the box B in position on the support, the stop 6 has nevertheless slid towards the front of the apparatus, thereby releasing the stop 9, whose vertical portion, on rising, serves to hold a new box B' waiting on the positioning station.

Once the box B is in place, the actuators 7 are operated, e.g. by means of an electrical control, so as to extend their rods 71.

Since the front end of the support 5 is resting against the bottom 11 of the apparatus, the support and the associated box is thus tilted forwards. The apparatus is then in the intermediate position of FIG. 1 where the arms 4 and the support 5 are shown in solid lines, which means that the box B is occupying an inclined position.

Once this position has been taken up, operation of the apparatus is locked and the operator can then remove parts contained in the box. The box is in a position that facilitates the removal of articles without any need to bend down.

It should be observed that in this particular position, the engagement fingers 411 of the arms 4 engage the studs 505 which project laterally on either side of the support. This co-operation prevents mutual tilting therebetween. The angle β between the longitudinal axis of each arm and the axis of the support 5 is then about 150°.

Once the box B is empty, it is removed. To do this, the actuators 7 are again actuated so that their rods 71 are extended further. Since mutual tilting between the arms and the support 5 is prevented, they rise as a unit until they occupy the high position as shown in chain-dotted lines in FIG. 1. End-of-stroke sensors can be used, for example, to stop the actuators 7.

The empty box is then removed via the removal station 2. This movement is facilitated by the slight slope of the rails 20.

The apparatus shown in FIG. 5 has the same structure as that described above except that the positioning station is at the top and the removal station is at the bottom.

Nevertheless, the box is transferred in the same manner, describing a path in the form of a reverse C-shape.

In such a mode of operation, in order to transfer the box downwards, the actuators act to slow down or block movement, which means that they serve to slow down the transfer which is performed by gravity. For this purpose, the two chambers of each actuator cylinder are interconnected via a valve of adjustable flow section.

When the support 5 is in its low position, a counterweight CP is connected to the arms 4 by a cable 8 and pulley 80 system which serves to lift the support to the top of the apparatus.

The actuators 7 are preferably hydro-pneumatic actuators.

Depending on their size, the boxes B can be put into place in the positioning station by means of a fork lift truck. They can be designed to be collapsible to make them easier to remove.

Naturally, the apparatus must guarantee complete safety for the operator at work. For this purpose, systems can be provided to lock the box in position in the event of a power failure. The zone situated beneath the support 5 can be made inaccessible by a roll-up curtain system fixed firstly beneath the support 5 and secondly to the bottom portion of the frame 1.

Although the present description is given with reference to an application in which the box put into place in the positioning station is a full box, it is possible to envisage the box being empty. The apparatus then serves to present and orient the box for the purpose of enabling articles to be received therein. The removal station then serves for removing a box that is full of articles. In such a configuration, the removal station is then preferably provided at the bottom so as to avoid pointlessly stressing the actuators.

As an indication, the apparatus can be designed for boxes that receive a payload of 1300 daN.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for presenting and orienting a stock box (B) to enable articles to be removed or accepted, the apparatus comprising a pair of parallel hinged arms (4) which are extended by a pivoting box support (5), the hinged arms (4) being movable between a low position and a high position, in both of which positions the support (5) is horizontal so that the box (B) can be placed on the support (5) or can be removed therefrom, the arms moving via an intermediate position in which the support (5) is inclined relative to the horizontal and facilitates access to the inside of the box (B) to remove said articles or to put them into place, and by the fact that said arms (4) have respective engagement fingers (410) at their free ends that cooperate with respective studs (505) secured to the support (5) to lock mutual hinging between the arms and the support from a desired angle respective to one another, thereby enabling the support (5) and the associated box (B) to be brought into an inclined position relative to the horizontal.

2. Apparatus according to claim 1, wherein said arms (4) are hinged firstly to a fixed frame (1) and secondly to said support (5).

3. Apparatus according to claim 1, wherein the apparatus includes actuator means (7) for actuating said hinged arms (4).

4. Apparatus according to claim 3, wherein said actuator means comprise an actuator (7) for transferring the box (B) upwards, and for transferring slowly the box (B) downwards.

5. Apparatus according to claim 3, wherein said actuator means comprise an actuator (7) for transferring the box (B) upwards, and for transferring slowly the box (B) downwards and for locking the box (B) as it is transferred downwards.

6. Apparatus according to claim 1, wherein in said intermediate position, said support (5) bears against an element (11) of the frame (1).

7. Apparatus according to claim 1, wherein the parallel arms (4) move within a given space and including a positioning station (2; 3) and a removal station (3; 2) for the box (B) which are placed vertically in register with the space.

8. Apparatus according to claim 7, wherein said stations (2; 3) have rails (20, 30) for guiding the box (B), said rails being inclined at a few degrees relative to the horizontal to facilitate putting the box on the support or removing the box from the support, said support (5) being in line with the rails (20, 30) when it is in its high position or its low position.

9. Apparatus according to claim 8, wherein said rails (20, 30) and/or the support (5) are provided with running wheels (22, 32, 52).

10. Apparatus according to claim 7, including means (6, 9) suitable for allowing a box (B) to be put into place on the support (5) only when the support is in line with the positioning stations (2; 3) without a box.

11. Apparatus according to claim 1, in which the box (B) is transferred downwards, wherein the apparatus includes a counterweight (CP) suitable for returning the support (5) to the high position to enable a new box (B) to be put into place.

12. Apparatus according to claim 1, wherein said angle is about 150°.

* * * * *